US010239533B2

(12) United States Patent
Tudosie

(10) Patent No.: US 10,239,533 B2
(45) Date of Patent: Mar. 26, 2019

(54) METHOD AND DEVICE FOR ANTICIPATORY OR PREDICTIVE ECONOMICAL RUNNING OF A MOTOR VEHICLE INCLUDING A DETERMINATION OF A ROUTE AND A PROBABLE DRIVING TIME AND TIME OF ARRIVAL

(71) Applicant: ZF Friedrichshafen AG, Friedrichshafen (DE)

(72) Inventor: Cosmin Tudosie, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 296 days.

(21) Appl. No.: 15/027,510

(22) PCT Filed: Sep. 11, 2014

(86) PCT No.: PCT/EP2014/069340
§ 371 (c)(1),
(2) Date: Apr. 6, 2016

(87) PCT Pub. No.: WO2015/051968
PCT Pub. Date: Apr. 16, 2015

(65) Prior Publication Data
US 2016/0244062 A1    Aug. 25, 2016

(30) Foreign Application Priority Data
Oct. 11, 2013   (DE) .................. 10 2013 220 604

(51) Int. Cl.
*B60W 30/14*   (2006.01)
*B60W 30/188*   (2012.01)
(Continued)

(52) U.S. Cl.
CPC .......... *B60W 30/188* (2013.01); *B60W 10/02* (2013.01); *B60W 10/04* (2013.01);
(Continued)

(58) Field of Classification Search
CPC .. B60W 30/14; B60W 30/143; B60W 30/188; B60W 50/0097
See application file for complete search history.

(56) References Cited

U.S. PATENT DOCUMENTS 7,369,938 B2     5/2008  Scholl
2011/0313647 A1* 12/2011  Koebler .............. B60L 15/2045
                                              701/123

(Continued)

FOREIGN PATENT DOCUMENTS

DE       101 62 866 A1    7/2003
DE       103 27 255 A1    2/2004
(Continued)

OTHER PUBLICATIONS

German Search Report Corresponding to 10 2013 220 604.6 dated Jul. 11, 2014.

(Continued)

*Primary Examiner* — Edwin A Young
(74) *Attorney, Agent, or Firm* — Davis & Bujold PLLC; Michael J. Bujold

(57) ABSTRACT

A method for anticipatory or predictive operation of a motor vehicle having a drive control system by which drive-relevant components of the drive-train are adjusted, and a detection system by which a travel route and anticipated driving time to a specified destination as well as the current position of the vehicle are determined. By way of the detection system and based on topographical information, a driving resistance profile of the route is prepared, to parameterize the drive control system such that the route is driven in a specifiable manner. If a need arises during the journey, a nominal arrival time or a travel route is specified or modified and, in accordance with the specified or changed nominal arrival time or route, the drive control system is (Continued)

dynamically re-parameterized so that the vehicle reaches its destination at the time concerned with regard to an efficient mode of operation.

12 Claims, 1 Drawing Sheet

(51) Int. Cl.
*B60W 50/00* (2006.01)
*B60W 50/08* (2012.01)
*B60W 50/10* (2012.01)
*B60W 10/02* (2006.01)
*B60W 10/04* (2006.01)
*B60W 10/10* (2012.01)
*B60W 10/18* (2012.01)
*B60W 30/18* (2012.01)
*G01C 21/34* (2006.01)
*G01C 21/36* (2006.01)
*G08G 1/0968* (2006.01)

(52) U.S. Cl.
CPC ............ *B60W 10/10* (2013.01); *B60W 10/18* (2013.01); *B60W 30/143* (2013.01); *B60W 30/18072* (2013.01); *B60W 50/0097* (2013.01); *B60W 50/087* (2013.01); *B60W 50/10* (2013.01); *G01C 21/3469* (2013.01); *G01C 21/3492* (2013.01); *G01C 21/3697* (2013.01); *G08G 1/096827* (2013.01); *G08G 1/096844* (2013.01); *B60W 2030/1809* (2013.01); *B60W 2050/0064* (2013.01); *B60W 2530/10* (2013.01); *B60W 2530/16* (2013.01); *B60W 2550/12* (2013.01); *B60W 2550/143* (2013.01); *B60W 2550/22* (2013.01); *B60W 2550/402* (2013.01); *B60W 2720/103* (2013.01); *Y02T 10/52* (2013.01); *Y02T 10/84* (2013.01)

(56) References Cited

U.S. PATENT DOCUMENTS

| | | |
|---|---|---|
| 2012/0035828 A1 | 2/2012 | Yamanaka et al. |
| 2013/0096792 A1* | 4/2013 | Maier .................. B60W 10/02 701/65 |
| 2013/0261914 A1* | 10/2013 | Ingram ................ B64C 39/024 701/70 |

FOREIGN PATENT DOCUMENTS

| | | |
|---|---|---|
| DE | 103 35 927 A1 | 3/2005 |
| DE | 10 2004 017 115 A1 | 10/2005 |
| DE | 10 2005 050 753 A1 | 4/2007 |
| DE | 10 2005 055 243 A1 | 5/2007 |
| DE | 10 2008 005 328 A1 | 7/2008 |
| DE | 10 2007 027 133 A1 | 12/2008 |
| DE | 11 2009 004 626 T5 | 7/2012 |
| JP | H11-39592 A | 2/1999 |
| WO | 2010/071498 A1 | 6/2010 |
| WO | 2011/025443 A1 | 3/2011 |

OTHER PUBLICATIONS

International Search Report Corresponding to PCT/EP2014/069340 dated Mar. 16, 2015.
Written Opinion Corresponding to PCT/EP2014/069340 dated Mar. 16, 2015.

* cited by examiner

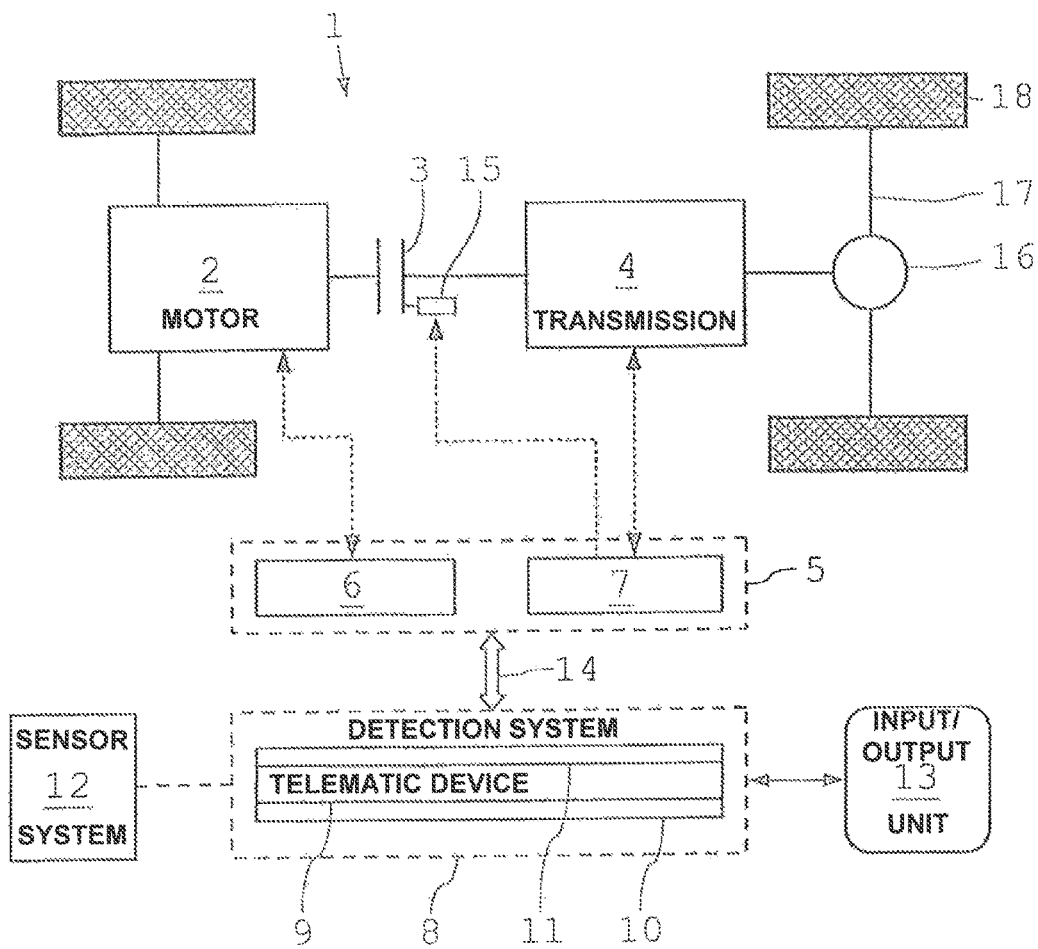

METHOD AND DEVICE FOR ANTICIPATORY OR PREDICTIVE ECONOMICAL RUNNING OF A MOTOR VEHICLE INCLUDING A DETERMINATION OF A ROUTE AND A PROBABLE DRIVING TIME AND TIME OF ARRIVAL

This application is a National Stage completion of PCT/EP2014/069340 filed Sep. 11, 2014, which claims priority from German patent application serial no. 10 2013 220 604.6 filed Oct. 11, 2013.

FIELD OF THE INVENTION

The invention concerns a method and a device for the anticipatory or predictive operation of a motor vehicle.

BACKGROUND OF THE INVENTION

Driver assistance systems (ADAS: Advanced Driver Assistance Systems) and navigation systems for the automation of driving functions in motor vehicles are becoming increasingly important. One aim of this is ultimately to enable largely automatic driving of the vehicle by detecting information about the surroundings of the vehicle by means of a close-range sensor system and a current position determination and by virtue of road features determined from digitalized two-dimensional or three-dimensional maps. By the calculation of driving times and distances to a destination and with support for the driver along a selected driving route, as well as by auxiliary aids such as traffic space monitoring, hazard warnings, lane assistance, distance assistance and emergency intervention controls, such systems contribute toward the continual improvement of road safety and traffic flow, and to the reduction of energy consumption when operating the motor vehicle.

DE 103 27 255 A1 describes an automatic control device for a vehicle, in which a nominal arrival time at a destination is specified. With reference to the distance from the destination at the time, which can be determined with the help of a navigation system, a nominal speed is calculated and the vehicle's speed is correspondingly controlled in relation to it.

From DE 103 35 927 B4 a navigation system of a motor vehicle and a method for determining a travel route are known, with which a maximum expected driving time between a starting point and a destination are specified. Out of a number of different possible routes, that with the probably lowest fuel consumption is chosen. To calculate that route in advance, nominal speeds are determined for individual road sections, and for this topological features such as uphill and downhill gradients and routes along the road sections are taken into account.

DE 10 2005 050 753 A1 describes an automatic control system of a motor vehicle with a navigation system, with which a driving resistance profile of a stretch ahead is determined. From this a strategy for driving along the stretch is developed, on the basis of which the transmission gear ratio is adjusted, a control unit for the drive motor is re-parameterized or an auxiliary drive is brought into play. The re-parameterization of the control data in the control unit of the drive motor is done in such manner that the motor is operated with emissions and consumption as low as possible. The user can input specifications such as the fastest, or else the most energy-saving travel mode along the stretch.

From DE 10 2007 027 133 A1 a navigation system and a method for reaching a destination at a desired arrival time are known, in which during the journey the current position of the vehicle is regularly compared with a position which, in accordance with an expected speed, the vehicle should have reached. By means of the navigation system, if there is a difference between these, then a speed recommendation permissible within the legal limits is issued such that the vehicle will reach its destination neither sooner, nor later than the desired arrival time. A current, actually permissible maximum speed or a speed to be expected having regard to traffic hold-ups can be interrogated by an external service-provider and imported into the navigation system.

DE 10 2008 005 328 A1 describes a method for the energy-efficient operation of a motor vehicle with a navigation system and a driver assistance system for controlling speeds and distances, and also with means for detecting the surroundings of a vehicle, wherein a travel route with a low fuel consumption is selected and topographical, traffic-situation, meteorological or load-relevant data are taken into account. During the journey, as a function of these data and also as a function of current information about objects that are moving in front of the vehicle and should be taken into account, an energy-saving operating mode of the vehicle is determined and/or an energy-saving route is adapted. The energy-saving operating mode can include the adjustment of a transmission ratio, coasting operation with the transmission idling, or a speed reduction in order to avoid unnecessary braking operations.

SUMMARY OF THE INVENTION

Against this background the purpose of the present invention is to further improve upon the known methods and devices for the anticipatory or predictive operation of a motor vehicle in relation to efficiency and application possibilities.

This objective is achieved by the characteristics specified in the independent claims, while advantageous design features and further developments of the invention emerge from the subordinate claims.

The invention is based on the recognition that in a vehicle having systems for predictive operational functionality, a drive-train control system for the control and regulation of drive-relevant systems of the vehicle can be parameterized in order to enable energy-efficient driving operation adapted to the topographical conditions while traveling along the road-stretch concerned. With such a system it is possible by means of suitable information exchange and data processing to react automatically to current adaptations of the operational planning of the vehicle which are desired by an authorized user, with a correspondingly dynamic re-parameterization of the drive-train control system.

Accordingly, the invention starts from a method for the anticipatory and predictive operation of a motor vehicle having a drive-train control system by means of which drive-relevant components of the drive-train of the motor vehicle are adjusted and having at least one detection system by means of which a travel route and an anticipated driving time between a starting point and a destination as well as the current position of the vehicle are determined, in which by means of the detection system and on the basis of topographical information a driving resistance profile of the travel route is prepared in order to parameterize the drive-train control system in such manner that the travel route is covered in a manner that can be specified.

To achieve the stated objective in relation to the method, the invention provides that if a current need arises during the journey, a nominal arrival time or a travel route is specified or modified, and the drive-train control system is dynamically re-parameterized in accordance with the specified or modified nominal arrival time or travel route so that the vehicle reaches the destination at the time concerned, having regard to an efficient mode of operation.

Parameterization of a drive-train control system is understood to mean the provision of control and/or regulation facilities, performance data or algorithms with magnitudes, functions or auxiliary data which influence the operation of components or aggregates of the drive-train of a motor vehicle in a specific manner. Re-parameterization means a modification or extension of the parameterization.

By virtue of the invention the use of a vehicle which, by means of navigation systems, assistance systems or the like is endowed with anticipatory or predictive functionality regarding its driving operation, can, at the request of a fleet operator, driver or other persons authorized to influence the use of the vehicle even during a journey, be automatically adapted to a specified situation. Basically the invention can be used with any motor vehicle having an automated or automatic drive-train, a suitable drive engine regulation system and brake and/or transmission regulation systems, both in the passenger car sector and in the commercial vehicle sector.

With the help of the invention, on the one hand estimated arrival times can be observed and on the other hand unnecessary and cost-intensive waiting times can be avoided, whereby the energy consumption for covering a particular travel route is kept as low as possible. In particular, for the operator of a fleet of commercial vehicles it is possible to react to current everyday circumstances and to avoid temporary bottlenecks in transport operations or at companies or end customers. With the method according to the invention it is also possible to coordinate several vehicles in such manner that, as required, they arrive at a destination at the same time or at predetermined time intervals. Correspondingly, the arrival times are adapted in accordance with the legal boundary conditions applicable for the road section concerned, and the mode of operation of the vehicles is influenced in an energy-efficient manner at least inasmuch as this concerns expedient arrival time shifts. In individual cases, during preliminary scheduling a temporarily higher fuel consumption can be accepted so that the vehicle will reach a destination at the desired time.

In this case the owner, operator or driver of the vehicle is aware that in a total-cost calculation for the transport of goods by the motor vehicle, the storage costs for the freight to be transported, the remuneration of the driver, the costs relating to vehicle wear, road-toll costs and fuel costs that sometimes vary regionally during the journey have to be taken into account. Against that background it can make sense to divide the roads to be driven on into part-sections and optimize the latter with regard to the cost-related and time-related re-parameterization of the drive-train-relevant control units. On average, when driving along a stretch lower fleet consumption and savings of time and costs are achieved by a more flexible and realistic re-parameterization of the control unit or units of the vehicle.

In a preferred embodiment of the invention it can be provided that a nominal arrival time is entered manually into the drive-train control system by the driver or by an authorized outside user by means of a remote input device or a connected telematic device, and that for the stretch ahead of the vehicle an average speed is calculated having regard to the current position and the nominal arrival time, and that a speed range is calculated which is limited by a maximum permitted and maximum possible driving speed for downhill coasting operation in which the force flow in the drive-train is interrupted, and a minimum acceptable and minimum possible uphill speed, and the drive-train control system is re-parameterized in such manner that with regard to the necessary average speed and making use of the speed range, the vehicle drives along the stretch concerned in an energy-efficient operating manner.

Accordingly, when coasting downhill or on level ground with the drive-train open the drive motor, the transmission and, if present, any permanent braking devices such as a hydrodynamic or electrodynamic retarder can be adjusted for a maximum speed and, when driving on uphill sections, for a minimum speed. The arrival time specified and the average speed derived therefrom then result in automatic re-parameterization with regard to the driving resistance profile of the stretch and the available speed range, with the aim of covering the stretch in an energy-saving manner.

It can be provided that a re-parameterization of the drive-train control system acts upon a drive motor of the vehicle in that a rotational speed control and/or a torque control system is varied, and/or it acts upon a brake mechanism by varying brake actuation or braking action, and/or it acts on a vehicle transmission by changing a gear ratio, and/or it acts on a clutch by actuating it in the opening or closing direction.

Accordingly, the re-parameterization of the drive-train control system can act on an engine control in a suitable manner. For example, it makes sense to operate a drive motor in the form of an internal combustion engine during the journey to the destination as often and for as long as possible in the operating ranges with the lowest possible fuel consumption with regard to the load, and to adapt the speed correspondingly. In particular, the re-parameterization can also act upon the vehicle transmission in that a gear ratio or gearshifting strategy is changed. For example, this takes place in such manner that the vehicle drives up a hill very slowly if possible, but in a fuel-saving manner, provided that this is still compatible with the desired arrival time. The re-parameterization of the drive-relevant control units can also act upon a retarder in that while moving downhill, and while still ensuring driving safety, the braking time, braking intervals or braking pressure are varied. The drive-train can also be temporarily opened by means of a clutch so that the vehicle coasts without traction force.

The method can be implemented in a particularly practical manner by dividing the travel route into road segments for each of which a driving resistance profile is determined and a parameterization or re-parameterization of the drive-train control system is carried out. Accordingly, for individual part-stretches a suitable parameterization can be determined and used. This gives the method high location and time resolution.

To refine the driving resistance profile prepared on the basis of topographical information, it can be provided that besides the resistance due to gradients, other factors relevant to driving resistance as well, such as air resistance, rolling resistance and/or resistance to acceleration are determined. The real driving resistance while covering the travel route is crucial for the actual energy consumption and the arrival time at the destination. Accordingly, when available every possible component that contributes toward driving resistance should be taken into account. This enables even more accurate adaptation of the operating mode of the vehicle to individual road sections, with regard to the arrival time.

It can further be provided that to determine the travel route, vehicle-related information such as its dimensions and mass, and road section related information such as environmental zones, road-toll stretches, restrictions applicable to hazardous goods categories, road categories and road dimensions, and finally current information such as meteorological announcements or traffic congestion warnings (traffic jams), are all taken into account.

By virtue of this extended information it becomes possible to exclude road sections which would probably be difficult for the vehicle to cover, or which have current or frequent traffic jams, or which are already blocked. For example, points of restricted width can be avoided, hazardous goods transport can bypass built-up areas whenever possible, or when the weather makes road conditions difficult commercial vehicles can be driven only on roads cleared of snow, or along routes that largely avoid steeper gradients.

Furthermore, whenever possible, appropriate and justifiable, stretches with toil charges are avoided. For example, instead of motorways only federal highways, public two lane expressways or rural roads are used when, despite this, the calculated necessary average speed can be maintained. Where traffic is obstructed, the vehicle may possibly be diverted, depending on the desired arrival time, or it may not. For example, if the duration of the traffic obstruction is foreseeable it may be appropriate for the fleet operator to shift the arrival time by a change of plan, in order to avoid higher fuel consumption by driving round a diversion. Some of this information, such as the vehicle's mass and the weather conditions, can also be used when calculating the driving resistance.

Furthermore, it can be provided that all the relevant information is transmitted by way of a standardized data transfer protocol and brought together in a telematic device.

In that case the information exchange to and from the vehicle required for automatic driving can take place by way of a standardized interface such as the known ADASIS (Advanced Driver Assistance Systems Interface Specifications) protocol. By means of the ADASIS protocol standardized communication between navigation systems and future driver assistance systems on the one hand, and applications or users of those systems on the other hand, is defined.

The data exchange of various applications and systems can be brought together in a standard on-board unit of a telematic system, such as the definitive Openmatics Platform developed by ZF Friedrichshafen AG. For example, a fleet operator can transmit a desired arrival time or a route change by wireless communication to the on-board unit of the motor vehicle. This on-board unit contains and also processes the information about the travel route, the driving resistance profile, the average speed, etc. The information is available for display to the driver in his driver's cabin, and also for use in various control units for controlling the drive-train.

The information required for controlling the drive-train can at least in part be learned autonomously during the operation of the vehicle, by way of appropriate software and suitable sensors, and used for the dynamic re-parameterization of the drive-train control system. The information can additionally be transmitted by wireless means to a receiver of the fleet operator, or directly to receivers in his vehicles, and used further by them.

The invention also concerns a device for the anticipatory and predictive operation of a motor vehicle, which has a drive-train control system, by means of which drive-relevant components of the drive-train of the motor vehicle can be adjusted, and at least one detection system by means of which a travel route and an anticipated driving time between a starting point and a destination, as well as the current position of the vehicle, can be determined, such that by means of the detection system and on the basis of topographical information a driving resistance profile of the travel route can be prepared in order to parameterize the drive-train control system in such manner that the travel route can be covered in a specifiable manner. To achieve the stated objective in relation to the device, the invention provides that the drive-train control system is designed for the manual and/or telematic input and processing of information, or can be connected to such a telematic device and, following the reception of information, can be automatically re-parameterized, so that at least information about a desired variation of an arrival time or a travel route can be used.

BRIEF DESCRIPTION OF THE DRAWINGS

To clarify the invention the description of a sole drawing of an example embodiment is attached. The sole drawing is a schematic representation of the structure of a drive-train of a commercial vehicle which has a drive-train control system.

DETAILED DESCRIPTION OF THE PREFERRED EMBODIMENTS

The drive-train 1 of the commercial vehicle comprises a drive motor 2 in the form of an internal combustion engine, which can be brought into driving connection with an automatic or automated vehicle transmission 4 by way of a separator clutch 3 or a torque converter that can be bridged. The separator clutch 3 or bridging clutch of the torque converter can be moved to a closed position and an open position with the help of a clutch actuator 15. By means of the transmission 4 various gear ratios can be obtained. The output side of the transmission 4 is in driving connection, via a driveshaft, with a differential transmission 16, which transmits drive torque by way of at least one driven axle 17 to wheels 18 of the vehicle. Instead of this conventional drive-train, a hybrid drive-train with an internal combustion engine and an electric motor can also be used.

The operation of the commercial vehicle can be controlled and regulated by means of a drive-train control system 5 comprising an engine regulator 6 and a clutch and transmission regulator 7 for controlling and regulating the drive motor 2, the transmission 4 and the clutch actuator 15. It can be seen that the drive-train control system 5, or its engine regulator 6 and clutch and transmission regulator 7, are connected via sensor and control lines (shown as dotted lines) to the clutch actuator 15 and to actuators or sensors (not shown) on the drive motor 2 and on the transmission 4.

The drive-train control system 5 is connected to a detection system 8. The detection system 8 comprises a telematic device 9 known as such, which is in the form of a so-termed on-board unit. The telematic device 9 is a processor-controlled component of a telematic system, for example the known Openmatics Platform. In addition the detection system 8 comprises a navigation system 10 with position determination, for example a GPS system, which is connected to the telematic device 9 or integrated with it. To the detection system 8 can be connected indirectly or directly a sensor system 12 and one or more input and output devices 13, for example an office computer or a portable computer (Laptop, etc.). The input, readout, display and storage of data can take place by both circuitry and wireless means, for example by mobile radio systems, WLAN or Bluetooth. Communication takes place via a standardized interface 11, for example the known ADASIS protocol.

The drive-train control system 5 or its individual control units 6, 7 can access information available in the detection system 8 via a data connection 14, for example a CAN bus, by way of the interface 11.

The navigation system 10 contains digital maps stored in a memory, which are provided with additional attributes, in particular with topographical features such as uphill and downhill gradients and speed limits, and if necessary also road categories or toll roads. Via the interface 11 current information can be received continuously, such as information about the current traffic flow on the stretch being driven upon or about to be driven upon, or weather data. During operation of the vehicle this current information is used in order to update the data stored in the navigation system 10 for forthcoming calculations, whereby realistic driving resistance profiles and/or arrival times for a preselected or dynamically varied road stretch can be calculated.

In the telematic device 9, vehicle-relevant information can also be stored, such as the current and loading-dependent vehicle mass and the current vehicle dimensions. The driver of the vehicle can manually transmit information to the detection system 8 or recover it therefrom, as can an authorized user by means of a remote input device.

The carrying out of the method according to the invention is explained below with reference to a practical example:

A truck is to transport freight to a destination and be unloaded there. At the starting point of the journey, by means of the detection system 8 and with regard to all the road-related and vehicle-related information known and available at the time, a travel route appropriate according to specifications and requirements and a driving resistance profile for that route are determined and an anticipated arrival time is displayed to the driver. Then, on the basis of the predictive information acquired by the detection system 8, the drive-train control system 5 determines a travel route having downhill coasting phases that favor fuel economy and efficient uphill gear ratios, and sets that as the route to be used. Unnecessary gearshift processes of the transmission 4 are avoided as much as possible. The vehicle then drives off and uses the route identified and the planned control parameters for the drive-train components of the vehicle.

On the basis of a specification by the time-and-logistics management system of the operator of a fleet of vehicles, during the journey the fleet operator uses a mobile radio system, via a coded and secure connection, to communicate to the detection system 8 of the commercial vehicle a nominal arrival time at which the vehicle should get to a loading ramp at its destination, so that no unnecessary waiting time and complex maneuvering processes will be needed there.

The drive-train control system 5 then accesses the current information and carries out a dynamic re-parameterization of the relevant controls 5, 6 for the drive motor 2, the separator clutch 3 and/or the transmission 4. Then, for the now applicable nominal arrival time and with regard to the driving resistance profile and other fixed or current boundary conditions or legal prescriptions, an average speed is calculated for the stretch of road ahead of the vehicle and the drive-train is controlled in such manner that with an operating mode that saves energy when driving on the uphill and downhill segments, the vehicle will arrive as punctually as possible at the new nominal arrival time.

LIST OF INDEXES

1 Drive-train
2 Drive motor
3 Separator clutch, torque converter
4 Transmission
5 Drive-train central system
6 Engine regulator
7 Transmission regulator
8 Detection system
9 Telematic device
10 Navigation system
11 Interface
12 Sensor system
13 Input and output unit
14 Data connection
15 Clutch actuator
16 Differential transmission
17 Axle
18 Wheel

The invention claimed is:

1. A method for anticipatory or predictive operation of a motor vehicle having a drive-train control system and a drive-train having drive-relevant components, and at least one detection system, the method comprising:
determining, with the detection system, a travel route and an anticipated driving time along the travel route between a starting point and a destination as well as a current position of the vehicle,
preparing, with the detection system, a driving resistance profile of the travel route based on topographical information of the travel route,
parameterizing the drive-train control system based on the driving resistance profile such that the drive relevant components of the drive-train are controlled by the drive-train control system such that the travel route is covered in a specifiable manner,
either specifying or modifying, with the drive-train control system, either a nominal arrival time or the travel route while traveling along the travel route, and
in accordance with the specified or the modified nominal arrival time or the travel route, dynamically re-parameterizing the drive-train control system such that the drive-relevant components of the drive-train are controlled by the drive-train control system so that the vehicle reaches the destination at the specified or the modified nominal arrival time while driving in a specified mode of operation.

2. The method according to claim 1, further comprising manually entering, via either a remote input device or a connected telematic device, the nominal arrival time in the drive-train control system by either a driver or an authorized outside user,
calculating, with the drive-train control system, an average speed for a road segment ahead of the vehicle with reference to the current position and the nominal arrival time,
calculating, with the drive-train control system, a speed range for traveling the road segment, and the speed range being limited by:
a maximum permitted and a maximum possible travel speed for downhill rolling operation during which a force flow in the drive-train is interrupted, and
a minimum permitted and a minimum possible uphill speed, and
re-parameterizing the drive-train control system such that, with the drive-relevant components of the drive-train being controlled by the drive-train control system with regard to a necessary average speed and based on the speed range, the vehicle drives the road segment in the specified mode of operation.

3. The method according to claim 1, further comprising re-parameterizing the drive-train control system such that controllers of the drive-relevant components at least one of:
- act upon a drive motor of the vehicle to change at least one of a rotational speed control and a torque control,
- act upon a brake mechanism to change either brake actuation or braking action,
- act upon a vehicle transmission to change a transmission gear ratio, and
- act upon a clutch to actuate the clutch in either a disengaging direction or an engaging direction.

4. The method according to claim 1, further comprising dividing, with the detection system, the travel route into road segments and determining, for each of the road segments, a driving resistance profile, and carrying out either the parameterizing or the re-parameterizing of the drive-train control system for each of the road segments.

5. The method according to claim 1, further comprising preparing, with the detection system, the driving resistance profile for the travel route based on at least one of air resistance, rolling resistance, a resistance to acceleration and a gradient resistance.

6. The method according to claim 1, further comprising determining, with the detection system, the travel route taking into account vehicle dimensions and vehicle mass.

7. The method according to claim 1, further comprising determining, with the detection system, the travel route taking into account environmental zones, travel route segments subject to toll charges, restrictions relating to transport of hazardous goods categories, road categories and road width dimensions.

8. The method according to claim 1, further comprising determining, with the detection system, the travel route taking into account at least one of a current traffic-situation and current meteorological warnings.

9. The method according to claim 1, further comprising transmitting at least the topographical information to the detection system by way of a standardized interface and collecting the topographical information with at least one of driving resistance information, vehicle-related information and travel route road segment information, via a telematic device, and re-parameterizing the drive-train control system based on at least one of the topographical information, the driving resistance information, the vehicle-related information and the travel route road segment information.

10. The method according to claim 1, further comprising controlling, with the drive-train control system, the drive-relevant components of the drive-train to drive the motor vehicle in the specified mode of operation in which fuel consumption is minimized and the motor vehicle arrives at the arrival destination at the nominal time of arrival.

11. A device for anticipatory and predictive operation of a motor vehicle, the device comprising:

- a drive-train control system having controllers that are connected to drive-relevant components of the drive-train which are adjustable by the drive-train control system,
- at least one detection system having a navigation system and a telematic device by which a travel route and an anticipated driving time, between a starting point and a destination, and a current position of the vehicle are determinable, the detection system preparing a driving resistance profile for the travel route based on topographical information from the navigation system, the drive-train control system being parameterized based on the driving resistance profile such that the drive-relevant components of the drive-train are controlled by the drive-train control system such that the travel route is covered in a specifiable manner, and
- the drive-train control system being designed for at least one of manual input and telematic input and processing of either a nominal arrival time or a variation of the travel route, and as a result of the nominal arrival time or the variation of the travel route, the drive-train control system is automatically re-parameterized such that control of the drive-relevant components by the drive-train control system is adjusted.

12. A method for either anticipatory or predictive operation of a motor vehicle having a drive-train control system, which controls drive-relevant components of the drive-train, and at least one detection system, the method comprising:
- receiving, into the detection system, vehicle driving resistance information, and receiving topographical information from a navigation system;
- determining, with the detection system, a travel route and an anticipated driving time between a starting point and an arrival destination as well as an anticipated arrival time;
- preparing, with the detection system, a driving resistance profile of the travel route based on the vehicle driving resistance information and the topographical information;
- controlling operation of the drive-relevant components of the drive-train with the drive-train control system by parameterizing the drive-train control system based on the driving resistance profile, such that the motor vehicle drives the travel route in a specifiable manner;
- either specifying or modifying, either a nominal time of arrival at the destination or the travel route, while the motor vehicle is driving along the travel route; and
- dynamically modifying operation of the drive-relevant components of the drive-train with the drive-train control system by re-parameterizing the drive-train control system based on either the nominal time of arrival or the travel route, such that the motor vehicle arrives at the arrival destination at the nominal time of arrival while driving the motor vehicle in the specifiable manner.

* * * * *